US006763150B1

(12) United States Patent
MacDonald (10) Patent No.: US 6,763,150 B1
(45) Date of Patent: Jul. 13, 2004

(54) IMAGE PROCESSING SYSTEM WITH MULTIPLE PROCESSING UNITS

(75) Inventor: Colin MacDonald, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 672 days.

(21) Appl. No.: 09/649,927

(22) Filed: Aug. 29, 2000

(51) Int. Cl.[7] .............................. G06K 9/54; G05B 9/60
(52) U.S. Cl. ............................... 382/304; 700/2; 700/4; 700/5
(58) Field of Search ................................ 382/162–166, 382/232, 234, 240, 302–304, 307–308; 345/502–519, 536–542; 700/2–5; 709/213–215; 712/10–22, 32–36

(56) References Cited

U.S. PATENT DOCUMENTS

| | | | | |
|---|---|---|---|---|
| 4,954,912 A | * | 9/1990 | MacDonald et al. | 358/448 |
| 5,579,412 A | * | 11/1996 | Ando | 382/240 |
| 5,701,509 A | * | 12/1997 | Kaneko | 712/11 |
| 5,790,134 A | * | 8/1998 | Lentz | 345/502 |
| 6,546,156 B1 | * | 4/2003 | Kanzaki et al. | 382/298 |

OTHER PUBLICATIONS

Tong et al., A JBIG Arithmetic Coder–Decoder Chip, IEEE, pp. 189–192 (1992).
PM–22 Multi–Function Image Processor, Oak Technology Codec Family, 3 pgs..
PM–48 Programmable Imaging DSP, Oak Technology DSP Family, 1 pg.
Core Description, Motorola, pp. 1–3.

* cited by examiner

Primary Examiner—Bhavesh M. Mehta
Assistant Examiner—Yubin Hung
(74) Attorney, Agent, or Firm—James L. Clingan, Jr.

(57) ABSTRACT

A circuit for processing a first image including two image supply blocks, two image processing units, a control unit and a plurality of buses. The image supply blocks assert selected lines of image data onto a respective one of first and second plurality of buses. The image processing units each process the data according to respective algorithms and provide respective update ok signals that each indicate that the respective image processing unit has completed use of the first sub-portion of data. The image supply blocks provide respective update signals to the image processing units in response to the update ok signals from both of the image processing units, transfer data from the second sub-portion to the first, and assert new data on the second sub-portion. Each image processing unit, in response to receiving both update signals, changes state to track the data without losing bus cycles to maintain performance.

7 Claims, 3 Drawing Sheets

IMAGE PROCESSING SYSTEM WITH MULTIPLE PROCESSING UNITS

FIELD OF THE INVENTION

The present invention relates to image processing, and more particularly to an image processing system that provides continuous uninterrupted access to non-aligned sections of a variable length data item to multiple image processing units using a common bus.

RELATED ART

Image processing denotes the performance of various functions on an image or set of images, such as compression, encryption, encoding, decoding, searching or feature recognition, image or color enhancement, resolution or size reduction, etc. A primary challenge for image processing hardware is to maintain performance at reasonable or reduced cost.

Various algorithms are known for image processing depending upon the particular technology. For facsimile or printer technologies, for example, image compression is desirable to reduce image data for purposes of transmission or storage. Some algorithms, such as raster image processing, involve processing a pixel or a group of pixels based upon one or more neighboring pixels, otherwise referred to as "context" for the pixel. For example, the CCITT recommendation T.6 or "Group IV" utilizes the Modified READ (MR) and Modified MR (MMR) compression algorithms that determine redundancy within each line and between adjacent lines of a bi-level image. The Group IV standard has been used for facsimile technology. The Joint Bi-level Image experts Group (JBIG) compression method is a newer standard that is intended to replace Group IV. JBIG processes each pixel by determining if the pixel may be predicted by one of two selectable prediction schemes and if not, coding the value arithmetically. Performing these tasks requires the value of the group neighboring pixels or context to be determined where the selection of the pixels for the context depends upon the particular task.

As the pixels in an image line are processed according to the JBIG algorithm, the context for both of the prediction schemes and the arithmetic coder need to be determined continuously. Delay in retrieving context data translates into a reduced level of performance. Hardware implementations of particular coders, such as implementations configured according to JBIG, are constrained to use data buses that are much smaller than potential image line sizes. Thus, the processing units that perform the prediction and arithmetic coding are constrained to obtain the context from a fixed-size data bus.

Similar problems exist for any practical image processing system that includes multiple image processing units coupled to a common, fixed-size bus. As the image is processed, the data on the bus must be updated as progress is made. For performance reasons, it is highly desirable that processing is not interrupted by bus updates. Furthermore, bus updates must not occur before all processing units are ready.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

Figure 1:
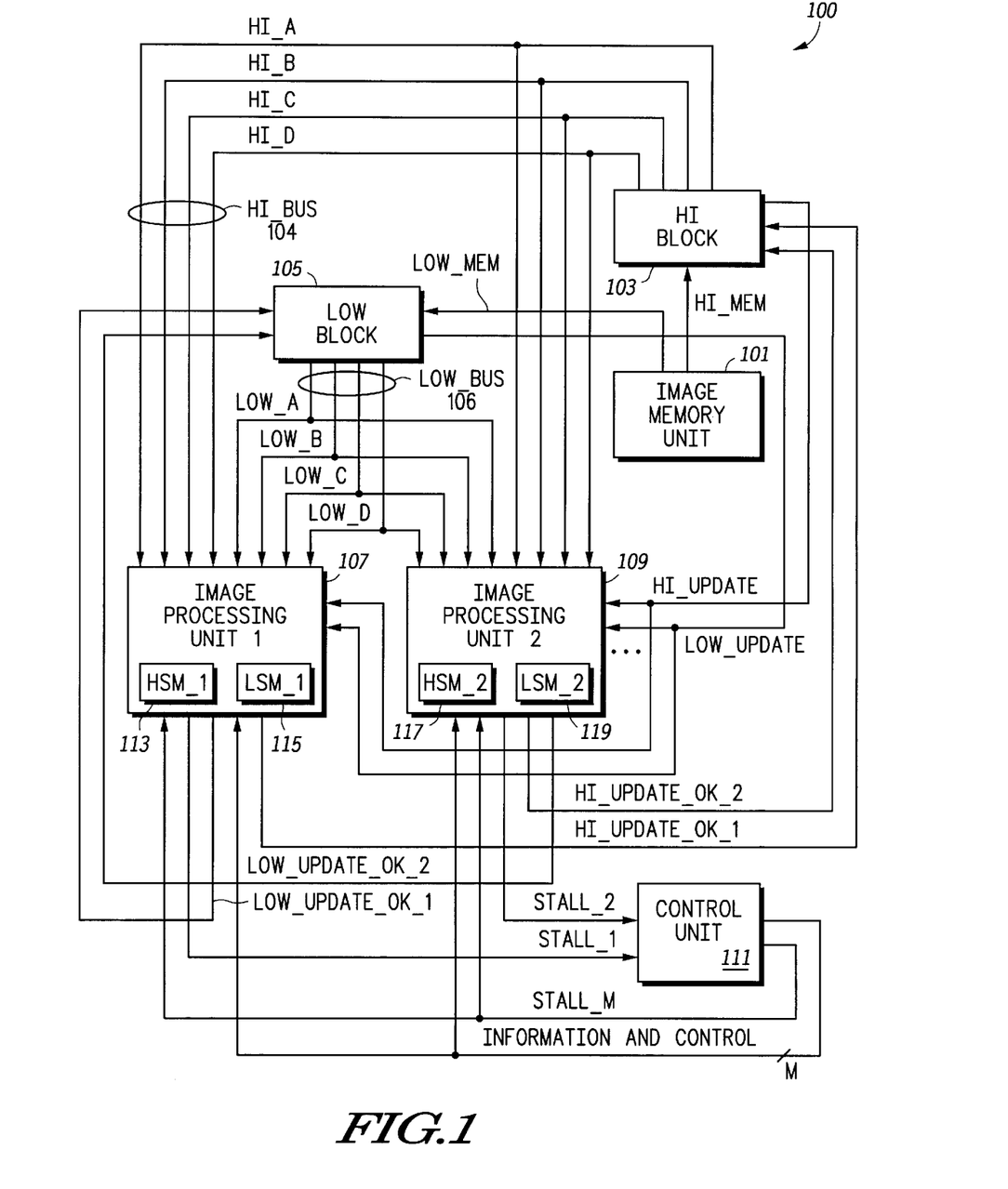
FIG. 1 is a simplified block diagram of an image processing system implemented according to an embodiment of the present invention.

FIG. 1 is a simplified block diagram of an image processing system 100 implemented according to an embodiment of the present invention. The image processing system 100 is described in relation to the JBIG compression method for bi-level images. It is noted, however, that the present invention is not limited to JBIG but is applicable to any image processing system or method in which image data is simultaneously fed to multiple image processing units utilizing a common bus or common set of buses.

A bi-level image typically contains only two colors stored as a single bit per pixel. Black-and-white images, such as pages of a book, are the most common type of bi-level images, although any two colors may be represented. JBIG processes redundant image data by comparing a pixel in a scan line with a set of pixels already scanned by an encoder. These additional pixels defined by a template are called a context, which forms a simple map of the pattern of pixels that surround the pixel that is being encoded. The values of the pixels in the context are used to identify predictable image data. Non-predictable data are then compressed using an adaptive arithmetic compression coder.

JBIG images may be encoded sequentially or progressively. Progressively encoded images start with the highest resolution image and end with the lowest. The high-resolution image is stored in a separate layer and is then used to produce a lower resolution image, also stored in its own layer. Each layer after the first layer is called a resolution doubling. For example, a 1200-dpi image may be encoded as one layer (1200 dpi), three layers (1200, 600, and 300 dpi), five layers (1200, 600, 300, 150, and 75 dpi), etc., where the lowest resolution is determined by whatever is considered useful. A 10 dpi image may be considered useful as an icon.

Progressive decoding is the opposite process, with the lowest image being decoded first, followed by increased resolutions of the image until the full resolution image is achieved. Only data up to the appropriate resolution of the output device need be decoded and sent. More particularly, each image layer is broken into a series of image line groups known as stripes and these stripes are processed or coded one at a time providing outputs known as Stripe Coded Data (SCD). Each image layer in a JBIG Image Entity is comprised of one or more SCDs. A first group of SCDs are used to create the lowest resolution image. The lowest resolution image is used with the next group of SCDs to create the next higher resolution image. This procedure is repeated by the decoder until the desired image up to the full image is decoded.

A JBIG encoder may include a resolution reduction (RR) unit, a typical prediction (TP) unit, a deterministic prediction (DP) unit and an adaptive arithmetic compression coder (AC) unit. The TP and DP prediction units are separately selectable for a particular application. During the progressive encoding process, the TP and DP units each receive a first or 100% image and a 50% image and determine whether it can predict the next pixel based on a given template or context of pixels as previously described. It is noted that the 100% image is not necessarily the full image, but may itself be a reduced image used in the progressive process for each iteration. If the pixel is predicted by either or both prediction units, then it is considered redundant data and can be discarded. Otherwise, the AC unit is used to compress the pixel into an SCD file. A JBIG decoder performs the reverse process and includes similar TP and DP units as well as an adaptive arithmetic compression decoder (AD) unit that performs the reverse process of the AC unit. It is noted that an AC unit may be used as the AD unit when operated in reverse mode.

A practical hardware JBIG image processing system (encoder or decoder or both) that performs the JBIG algorithm is constrained to use data buses that are usually much smaller than the potential image line size. Each image processing unit that performs the prediction or arithmetic coding are constrained to obtain contexts from a fixed size data bus. As the image is processed, however, the data on the bus must be updated. For performance reasons, it is desirable that processing not be interrupted by bus updates and that updates do not occur before all processing units are ready.

The image processing system 100 includes an image memory unit 101 that stores a first image and a second, reduced image that is based on the first image. For example, the first image may be a 100% image and the second a 50% image for JBIG. As described previously, the 100% image may be a full or original image or itself may be a reduced resolution image during the iterative image process. In the embodiment shown, the first image is a high (HI) resolution image and the second image is a low (LOW) resolution image. In one embodiment, the image processing system 100 may comprise an encoder which "processes" the first image based on the second image to generate a compressed data file that may be used in conjunction with the second image to re-create the first image. Or, in another embodiment, the image processing system 100 may comprise a decoder that processes or generates the first image based on data from the second image and other data.

The image memory unit 101 provides data of the first image on a HI_MEM bus to a first memory device or image supply block HI BLOCK 103 and provides data from the second image on a LOW_MEM bus to a second memory device or image supply block LOW BLOCK 105 memory device. The HI BLOCK 103 asserts data onto a HI_BUS 104, which further comprises four separate data buses individually labeled HI_A, HI_B, HI_C, and HI_D. Likewise, the LOW BLOCK 105 asserts data on a LOW_BUS 106, which further comprises four separate buses individually labeled LOW_A, LOW_B, LOW_C, and LOW_D.

Two image processing units 107 and 109, individually labeled image processing unit 1 and image processing unit 2, are each coupled to receive data from the HI_BUS 104 and the LOW_BUS 106. Image processing unit 107 asserts a HI_UPDATE_OK_1 signal to the HI BLOCK 103 and a LOW_UPDATE_OK_1 signal to the LOW BLOCK 105. Similarly, the image processing unit 109 asserts a LOW_UPDATE_OK_2 signal to the LOW BLOCK 105 and a HI_UPDATE_OK_2 signal to the HI BLOCK 103. The image processing unit 107 also asserts a stall signal STALL_1 to a control unit 111 and the image processing unit 109 asserts another stall signal STALL_2 to the control unit 111. The control unit 111 provides a master stall signal STALL_M to both of the image processing units 107, 109. The LOW BLOCK 105 asserts a LOW_UPDATE signal to the image processing units 107 and 109. The HI BLOCK 103 asserts a HI_UPDATE signal to the image processing units 107 and 109. The HI_UPDATE and LOW_UPDATE signals can be considered sub-portion update signals.

The image processing unit 107 includes two state machines HSM_1 113 and LSM_1 115 and the image processing unit 109 includes two state machines HSM_2 117 and LSM_2 119. As described below, the state machine HSM_1 113 controls operation of the HI_BUS 104 and the state machine LSM_1 115 controls operation of the LOW_BUS 106 for the image processing unit 107. Likewise, the state machine HSM_2 117 controls operation of the HI_BUS 104 and the state machine LSM_2 119 controls operation of the LOW_BUS 106 for the image processing unit 109.

It is noted that one state machine may be used for both of the HI_BUS 104 and the LOW_BUS 106 buses instead of two for both of the image processing units 107, 109, where predefined logic may be included to extract the appropriate number of context bits from each bus.

The control unit 111 asserts one or more INFORMATION AND CONTROL signals (denoted as m signals) to the image processing units 103, 105. These signals provide additional information regarding the location of the current data being processed. The additional information is continuously or otherwise periodically supplied to the image processing units 103, 105 so that they can process the image properly including taking care of edge and corner cases, such as at the top and bottom of an image, a stripe of data, the end of a line, etc. The information supplied is specific to the particular algorithm being performed. JBIG uses some signals to identify the last, second to last, third to last, etc., signals in a line so that the background may be factored in properly. For example, TopLine, BottomLine, NewLine and FinalPelCount signals (not shown) may be included for JBIG embodiments. The NewLine signal is pulsed by the control unit 111 to the image processing units 103, 105 before the start of processing for each line to reset the HSM_1 and LSM_1 state machines 113, 115. The FinalPelCount signals are used to identify the ultimate, penultimate, etc. pixels in a line to properly factor in the background.

It is noted that different signals and/or additional signals may be utilized for various configurations and embodiments. The present invention is not limited to any particular embodiments including JBIG embodiments but may be applied to any image processing system as will be recognized by those of ordinary skill in the art.

The image memory unit 101 may be implemented in any desired manner depending upon the desired speed and performance of a given system. For example, in one exemplary embodiment, the image memory unit 101 includes external dynamic random access memory (DRAM) devices that store the first and second images and corresponding direct memory access (DMA) controllers that each access respective portions of the first and second images into local static RAMs (SRAMs) (not shown). The HI BLOCK 103 and the LOW BLOCK 105 may each comprise registers or the like, where data is transferred from the SRAMs to the corresponding register memory upon assertions of the HI_UPDATE_OK_1 and HI_UPDATE_OK_2 signals or assertions of the LO_UPDATE_OK_1 and LO_UPDATE_OK_2 signals, respectively. In this manner, a portion of larger blocks of data stored in slower memory devices, such as DRAMs, is transferred using DMA or the like to faster memory devices, such as SRAMs as needed. Smaller portions of the data from the SRAM devices are then transferred to the faster register memory as needed.

Each of the individual buses of the HI_BUS 104 and LOW_BUS 106 may be any convenient size depending upon the implementation of the particular image processing system. In one embodiment, the HI_A, HI_B, HI_C, HI_D, LOW_A, LOW_B, LOW_C and LOW_D buses of the HI_BUS 104 and LOW_BUS 106 are each 16-bit buses, where the letters A, B, C and D refer to sequential lines of the respective image being processed. Thus, the HI_BUS 104 includes 16 bits of data from each of four lines (A–D) chosen or selected from the first image and the LOW_BUS 104 includes 16 bits of data from each of four lines (A–D) of the second image. In this manner, the HI_A–D buses contains data representative of a selected portion of selected lines of the first image, and the LOW_A–D buses contains data representative of a selected portion of selected lines of the second image.

The image processing units 107, 109 may comprise any type of image processing unit for performing any type of image processing algorithm known to those skilled in the art. The image processing unit 107 operates according to a first algorithm and the image processing unit 109 operates according to another or second algorithm. In the exemplary embodiment shown, for example, the image processing units 107 and 109 perform any one of multiple prediction or arithmetic functions used by the JBIG algorithm, and thus may comprise a TP, DP, RR for resolution reduction or AC unit, etc. Although only two image processing units 107, 109 are shown, it is understood that any number of additional processing units may be utilized depending upon the needs of the particular processing scheme. Although the same data is fed to the image processing units 107, 109 at the same time from the same buses, the image processing units 107, 109 may each utilize different portions of the data for performing their respective functions of their respective algorithms. For example, each of the image processing units 107, 109 may utilize a different template that references different data or bits from each line of the first and second images. This is true even if both image processing units 107, 109 are making determinations for the same output data, such as the next pixel to be processed.

It is further noted that the high and low buses 104, 106 are independent. Further, the LOW_BUS 106 may involve significantly less image data than the HI_BUS 104, and thus may be updated less often. Also, the data on each sub bus (HI_A–D and LOW_A–D) may further be subdivided into sub-portions, such as upper and lower portions. For example, each 16 bit portion may include a first or lower 8-bit portion and a second or upper 8-bit portion. The image processing units 107, 109 may operate on different sub-portions of each of the buses, so that the image processing unit 107 may be processing data from the upper portion of a bus while the image processing unit 109 is still processing data from the lower portion of the same bus, and vice-versa. As described further below, the HI_BUS 104 and LOW_BUS 106 are each updated only when all image processing units, such as 107, 109, are ready for the update.

In operation, data from the first image is provided from the image memory unit 101 into the HI BLOCK 103 and data from the second image is provided from the image memory unit 101 to the LOW BLOCK 105. Data transfer from the image memory unit 101 to the HI and LOW BLOCKs 103, 105 may be performed in any appropriate manner, such as DMA transfers or the like as previously described. Upon assertion of the HI_UPDATE signal from the HI BLOCK 103, the HI BLOCK 103 asserts or otherwise updates a portion of the data from line A onto the HI_A bus, a corresponding portion of data from line B onto the HI_B bus, a corresponding portion of data from line C onto the HI_C bus, and a corresponding portion of data onto the HI_D bus. In a similar manner, upon assertion of the LOW_UPDATE signal from the LOW BLOCK 105, the LOW BLOCK 105 asserts data from or asserts a corresponding portion of lines A, B, C and D of the second image onto the LOW_A, LOW_B, LOW_C, and LOW_D buses, respectively.

The image processing units 107 and 109 each utilize a portion of the data provided on each line of each HI_BUS 104 and LOW_BUS 106, where each subset of data includes zero or more bits. It is noted that if zero bits of the HI_BUS 104 (LOW_BUS 106) are used by the image processing unit 107, then the HI_UPDATE_OK_1 (or LOW_UPDATE_OK_1) remains asserted by the image processing unit 107. Likewise, if zero bits of the HI_BUS 104 (LOW_BUS 106) are used by the image processing unit 109, then the HI_UPDATE_OK_2 (or LOW_UPDATE_OK_2) remains asserted by the image processing unit 109. In this manner, zero or more bits are utilized by each of the image processing units 107 and 109 of each of the HI_A, HI_B, HI_C, HI_D, LOW_A, LOW_B, LOW_C, and LOW_D buses. Each of the HI_A–HI_D and LOW_A–LOW_D buses are further divided into multiple sub-portions such as a lower portion and an upper portion. Each of the image processing units 107 and 109 utilizes a sub-portion comprising any selection or group of the bits based upon a predetermined template definition. Each image processing unit 107, 109 begins with one of the sub-portions such as the lower sub-portion and sequentially utilizes respective groups of zero or more bits as defined by the template (the template defines the selection of bits and the selection of a specific group of bits with unique values produces a unique context) in sequential manner from the lower to the upper portions. In this manner, one or both of the image processing units 107, 109 eventually begins using all of data from the second portion or upper portion after finishing with the first or lower portion. The respective image processing unit asserts a corresponding HI_ or LOW_UPDATE_OK signal to the corresponding HI or LOW BLOCK 103, 105 indicating that it has completed use of the first sub-portion of the HI_ or LOW_BUS 104, 106. When all of the image processing units are done using the first sub-portion of a bus so that all of the HI_ or LOW_ UPDATE_OK signals are asserted, the relevant HI or LOW BLOCK 103, 105 asserts the corresponding UPDATE signal to update the corresponding bus.

As one of ordinary skill will recognize, processing units 1 and 2 each utilize significantly less than all of HI_BUS 104 and LOW_BUS 106 and this utilization can be offset or completely overlapping. In either case the spread of utilization of processing units 1 and 2 is less than half the width of either HI_BUS 104 or LOW-BUS 106.

In particular, when the image processing unit 107 is finished using the lower portion of the HI_BUS 104 including corresponding lower portions of each of the HI_A–D buses, and is only using the upper portion, it asserts the HI_UPDATE_OK_1 signal to the HI BLOCK 103. Likewise, when the image processing unit 107 is finished using the lower portion of the LOW_BUS 106 including corresponding lower portions of each of the LOW_A–D buses, and is only using the upper portion, it asserts the LOW_UPDATE_OK_1 signal to the LOW BLOCK 105. In a similar manner, when the image processing unit 109 is finished using the lower portion of the HI_BUS 104 or LOW_BUS 106, respectively, including corresponding lower portions of each of the HI_A–D or LOW_A–D buses, respectively, and is only using the upper portion, it asserts the HI_UPDATE_OK_2 signal or LOW_ UPDATE_OK_2 signal, respectively, to the HI BLOCK 103 or the LOW BLOCK 105, respectively.

The HI BLOCK 103 asserts the HI_UPDATE signal when all of the HI_UPDATE_OK signals from all of the image processing units are asserted and the LOW BLOCK 105 asserts the LOW_UPDATE signal when all of the LOW_UPDATE_OK signals from all of the image processing units are asserted. Thus, in the embodiment shown, the HI BLOCK 103 asserts the HI_UPDATE signal when the HI_UPDATE_OK_1 and HI_UPDATE_OK_2 signals are both asserted. Likewise, the LOW_BLOCK 103 asserts the LOW_UPDATE signal. when the LOW_ UPDATE_OK_1 and LOW_UPDATE_OK_2 signals are both asserted. In this manner, the HI_BUS 104 and the LOW_BUS 106 are only updated when all of the image processing units are ready for the bus update. Thus, bus updates are made when necessary to as progress is made by the image processing units. Further, the bus updates do not occur until all processing units are ready. As described further below, high performance is achieved since operation of the image processing units are not interrupted by the bus updates.

It is noted that, if for any reason, the HI_BUS 104 or the LOW_BUS 106 are not updated in time, each image processing unit detects a stall condition and asserts as corresponding stall signal. The image processing unit 107 asserts the STALL_1 signal upon a stall condition and the image processing unit 109 asserts the STALL_2 signal upon a stall condition. The control unit 111 asserts the STALL_M signal to all image processing units (or both units 107, 109) if any STALL signal is asserted. Regardless of whether the image processing unit 107 or 109 detects a stall condition, it remains in a stalled condition upon assertion of the STALL_M signal until the STALL_M signal is next negated. In this manner, both of the image processing units 107, 109 are stalled if either detects a stall condition.

Upon assertion of the HI_UPDATE signal, the HI BLOCK 103 changes or otherwise updates the data on the HI_BUS 104, and upon assertion of the LOW_UPDATE signal, the LOW BLOCK 105 changes or otherwise updates the data on the LOW_BUS 106. In one embodiment, the upper portion of each of the respective buses HI_A–D and LOW_A–D is transferred to the lower portion and the upper portion is asserted with new data. In an alternative embodiment, the upper portion remains the same whereas the lower portion is asserted with new data. Depending upon the particular embodiment, the image processing units 107, 109 may change states in response to assertion of the HI_UPDATE or LOW_UPDATE signals. For example, for the first embodiment in which the upper portion of the HI_BUS 104 is transferred to the lower portion and the upper portion is updated with new data, then the corresponding state machines HSM 113, 117 of both of the image processing units 107 and 109 change to equivalent bus states to track the bus data. In particular, the state machines HSM 113, 117 each change bus states to corresponding bit positions from the upper to the lower portion of the HI_BUS 104 to track the operative data. The same is true for the state machines LSM 115, 119 with respect to an update of the LOW_BUS 106.

Figure 2:
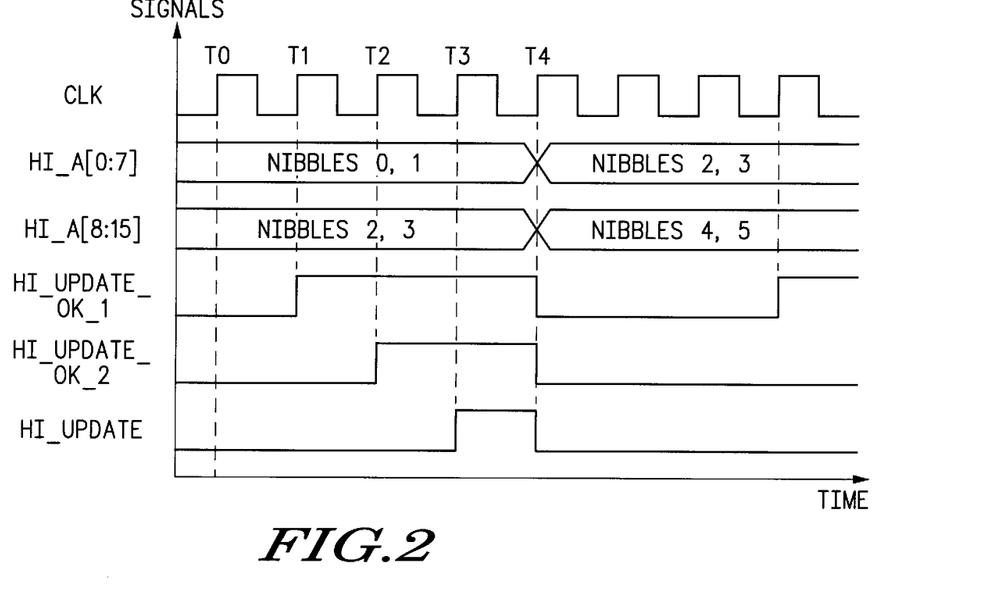
FIG. 2 is a timing diagram generally illustrating operation of a portion of the image processing system shown in FIG. 1.

FIG. 2 is a timing diagram generally illustrating operation of a portion of the image processing system 100 shown in FIG. 1. The timing diagram shows a master clock signal (CLK) plotted versus time that is provided for synchronous operation for each of the blocks of the image processing system 100. Also plotted versus time is the lower portion or bus bits of the HI_A bus 104, shown as the HI_A [0:7] signals, and the upper portion of the HI_A bus 104, shown as the HI A [8:15] signals. Also plotted versus time is the HI_UPDATE_OK_1, the HI_UPDATE_OK_2, and the HI_UPDATE signals. It is noted that corresponding data (not shown) is also asserted on the HI_B, HI_C and HI_D buses, for lines B, C and D, respectively. Operation of all of these buses is similar in that they are updated in similar manner at the same time as the HI_A bus is updated. Operation is similar for all of the respective buses of the LOW_BUS 106 in correlation with the LOW_UPDATE_ 1, LOW_UPDATE_2 and LOW_UPDATE signals for lines A–D of the second image.

At time T0, the lower portion of the HI_A bus 104 is initially asserted with two consecutive data nibbles 0, 1 of line A and the upper portion is asserted with the next two data nibbles 2, 3, where each nibble represents 4 bits of line A in the embodiment shown. It is noted that the nibbles are not shown in hexadecimal notation as actual data is not shown. At time T0, the HI_UPDATE_OK_1, the HI_HPDATE_OK_2, and the HI_UPDATE signals are negated low and not asserted. In this manner, the image processing units 107 and 109 are receiving data nibbles 0–3 on the HI_A bus 104.

At a subsequent time T1, the image processing unit 107 asserts the HI_UPDATE_OK_1 signal, whereas the HI_UPDATE_OK_2 signal remains low. In this manner, the image processing unit 107 is about to complete use or otherwise has completed using the lower portion of the HI_BUS 104 including the nibbles 0, 1 of the HI_A bus and needs only the upper portion of the HI_BUS 104 including the nibbles 2, 3 of the HI_A bus. The image processing unit

109, however, still requires some part of the lower portion of the HI_BUS 104, such as the nibbles 0, 1 of the HI_A bus (or portions of the HI_B, HI_C or HI_D buses only). Thus, the HI_BUS 104 cannot yet be updated.

At subsequent time T2, the image processing unit 109 asserts the HI_UPDATE_OK_2 signal indicating that the image processing unit 109 is about to complete use or otherwise has completed using the lower portion of the HI_BUS 104 including the data nibbles 0, 1 of the HI_A bus and needs only the upper portion of the HI_BUS 104 including the nibbles 2, 3 of the HI_A bus.

At subsequent time T3, the HI BLOCK 103 asserts the HI_UPDATE signal to the image processing units 107, 109 indicating an update is to be made on the HI_BUS 104 on the next CLK cycle.

At subsequent time T4, the HI BLOCK 103 updates the data on the HI_BUS 104. In particular, the nibbles 2, 3 that were asserted on the upper portion of the HI_A bus is transferred to the lower portion and new, sequential data nibbles 4 and 5 are asserted on the upper portion of the HI_A bus. The HI_B, HI_C, and HI_D buses of the HI_BUS 104 are all updated in a similar manner. The HI BLOCK 103 negates the HI_UPDATE signal and the image processing units 107, 109 each negate their respective HI_UPDATE_OK_1 and HI_UPDATE_OK_2 signals at time T4. When the HI_UPDATE signal is asserted, the state machines HSM_1 113 and HSM_2 117 of the image processing units 107, 109, respectively, change state to track the data nibbles 2, 3 shifted from the upper portion to the lower portion of the HI_A bus. The data nibbles 2–5 are now provided to the image processing units 107, 109. The image processing units 107, 109 continue processing through the data nibbles 2, 3 in the lower portion to data nibbles 4, 5 in the upper portion in a similar manner until both are using only the data nibbles 4, 5 in the upper portion of the HI_A bus. The HI_BUS 104 is then updated in a similar manner where data nibbles 4, 5 are transferred to the lower portion and new data nibbles 6 and 7 are asserted on the upper portion. Operation continues in this manner until the image line is completed. Transition from one line to the next occurs in a similar manner. Similar operation occurs for the HI_B, HI_C, and HI_D buses. It is noted that in some embodiments, the behavior is different at the start of an image line. For example, the STALL_M signal may be asserted until data is valid on both HI_BUS 104 and the LOW_BUS 106 assuming both are required. A NewLine pulse signal resets state machines for the start of image line. When the STALL_M signal is negated, state machine transitions are enabled.

Figure 3:
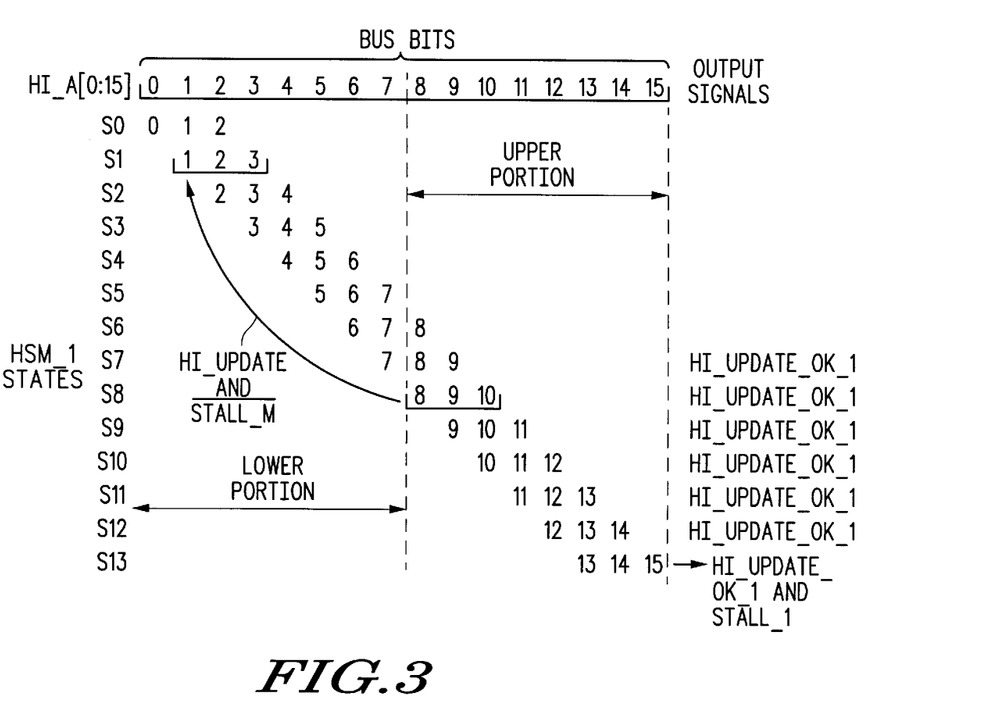
FIG. 3 is a diagram in chart form illustrating operative states of a state machine of an image processing unit of FIG. 1 in accordance with an embodiment of the present invention.

FIG. 3 is a diagram in chart form illustrating operative states of the HSM_1 113 of the image processing unit 107 in accordance with an embodiment of the present invention. The respective bus bits of the HI_A bus of the HI_BUS 104, shown as signals HI_A [0:15], are shown at the top of the chart diagram. The respective 14 states of the HSM_1 113 state machine are shown along the vertical axis of the chart labeled as S0, S1, S2, ..., S13. Also, output signals of the image processing unit 107 are shown on the right hand side of the chart. It is noted that the HSM_1 113 may also control the selection of other bits of the HI_BUS 104, such as zero or more bits from each of the HI_B, HI_C and HI_D buses depending upon the context definition. As the HSM_1 113 operates in a similar manner, the HI_B–D buses are not shown for clarity of explanation. In alternative embodiments, multiple state machines may be employed for operation with the HI_BUS 104 (and LOW_BUS 106), such as one for each of the buses HI_A–D (and LOW_ A–D), where the multiple state machines are configured to track each other. The operation of the state machine HSM_2 117 is similar although it may be configured to operate on a different subset of the bits of the HI_BUS 104 depending upon its defined template. The operation of both of the state machines LSM_1 115 and LSM_2 119 is similar except in relation to the LOW_BUS 106.

During normal operation, the HSM_1 113 transitions between adjacent states, such as from state S0 to state S1, then from state S1 to state S2, etc. upon its successive assertions of the CLK signal. In a stall condition, such as detected by the HSM_1 113 or when the STALL_M signal from the control unit 111 is asserted, the HSM_1 113 remains in the same state during successive CLK assertions until the STALL_M signal is negated, at which time operation proceeds as normal. As shown in the chart of FIG. 3, the HSM_1 113 is configured to use 3 bus bits at a time of the HI_A bus, beginning with bits HI_A[0:2] in the first state S0, bits HI_A[1:3] in the second state S1, bits HI A[2:4] in the third state S2, and so on. In this manner, the HSM_1 113 of the image processing unit 107 operates using data solely from the lower portion of the HI_A bus up and to including state S5. At state S6, the HSM_1 113 uses bus bits HI_A [6:8] and thus transitions between the lower and upper portions of the HI_A bus. Operation continues to transition from the lower portion to the upper portion of the HI_A bus between states S6 to states S8, where in state S8, the HSM_1 113 uses bus bits HI_A[8:10] solely from the upper portion of the HI_A bus.

In the last state just prior to the image processing unit 107 transitioning completely to the upper portion of the HI_BUS 104, the image processing unit 107 asserts the HI_UPDATE_OK_1 signal to inform that control unit 111 that it may update the HI_BUS 104. As shown in the chart, for example, during state S7 just before complete transition into the upper portion of the HI_A bus as is the case for state S8, the image processing unit 107 asserts the HI_UPDATE_OK_1 signal. The HI_UPDATE_OK_1 signal is asserted for the remainder of states of the HSM_1 113 up and through state S13, where the HSM_1 113 is completely operating in the upper portion of the HI_BUS 104. It is noted, however, that the chart of FIG. 3 shows only the operation of the HSM_1 113 in relation to the HI_A bus of the HI_BUS 104. If the HSM_1 113 or other state machines of the image processing unit 107 are still using bits from the lower portion of the HI_BUS 104 in state S8, then the HI_UPDATE_OK_1 signal would not be asserted in state S7, but instead would be asserted in whichever state is the last state that the image processing unit 107 utilizes bits from the lower portion of the HI_BUS 104. For purposes of the present discussion it is assumed that the HSM_1 113 in relation to the HI_A bus defines the necessary state transitions.

During the next state S8, the HSM_1 113 operates on bus bits HI_A[8:10], so that the image processing unit 107 is operating completely from the upper portion of the HI_BUS 104. If the HI_UPDATE signal from the HI BLOCK 103 is asserted and if the master stall signal STALL_M is not asserted while the HSM_1 113 is in state S8, then the image processing unit 107 does not transition to state S9, but instead transitions back to state S1 to process the bus bits HI_A[1:3] rather than the bits HI_A[9:11]. The reason for this is that the HI BLOCK 103 has moved the nibbles of data that were originally asserted on bus bits HI_A[8:15] comprising the upper portion of the HI_A bus to the bus bits HI_A[0:7] comprising the lower portion of the HI_A bus as illustrated by the timing diagram of FIG. 2. For example, as shown in FIG. 2, if the HSM_1 113 is using bits from the nibbles 2, 3 in the upper portion of the HI_A bus when the HI_UPDATE signal is asserted, operation proceeds in the next CLK cycle, such as indicated at time T4, to corresponding bits in the lower portion of the HI_A bus to track the nibbles 2, 3. As described further below, state S1 corresponds to state S9 in which corresponding bits of the upper and lower portions of the bus are being accessed.

Figure 4:
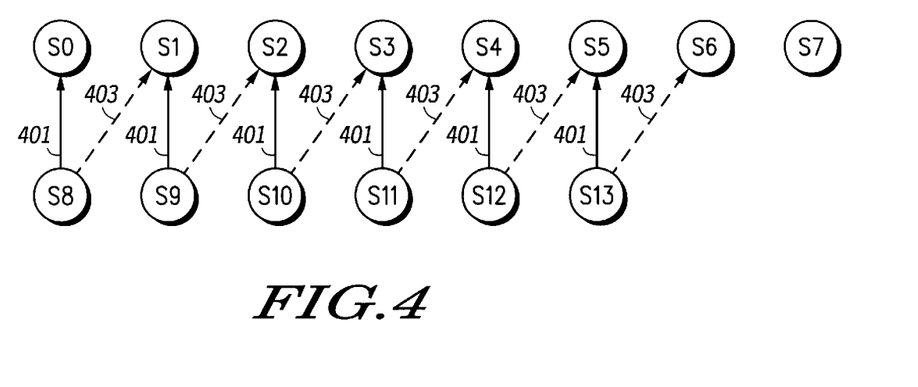
FIG. 4 is a graph diagram illustrating corresponding states of the state machine of the image processing unit of FIG. 1.

FIG. 4 is a graph diagram illustrating corresponding states of the HSM_1 113 of the image processing unit 107. In particular, as indicated by solid arrows 401, states S0–S5 correspond to states S8–S13, respectively. The relative bit positions of the upper and lower portions of each bus is equivalent in corresponding states. In this manner, a transition to a state corresponding to the next state enables the state machines to automatically track the appropriate data when the HI BLOCK 103 or the LOW BLOCK 105 swaps data nibbles as previously described. In a stall condition upon assertion of the STALL_M and HI_UPDATE signals, operation transitions to a corresponding state to track the same data bits moved from upper to lower portions of the bus. If a stall condition does not exist such that STALL_M is not asserted when the HI_UPDATE signal is asserted, operation transitions to the corresponding state of the next state as indicated by the dashed arrows 403. The dashed arrows 403 indicate transitions from states S8–S13 to next corresponding states S1–S6, respectively, during normal operation.

Figure 5:
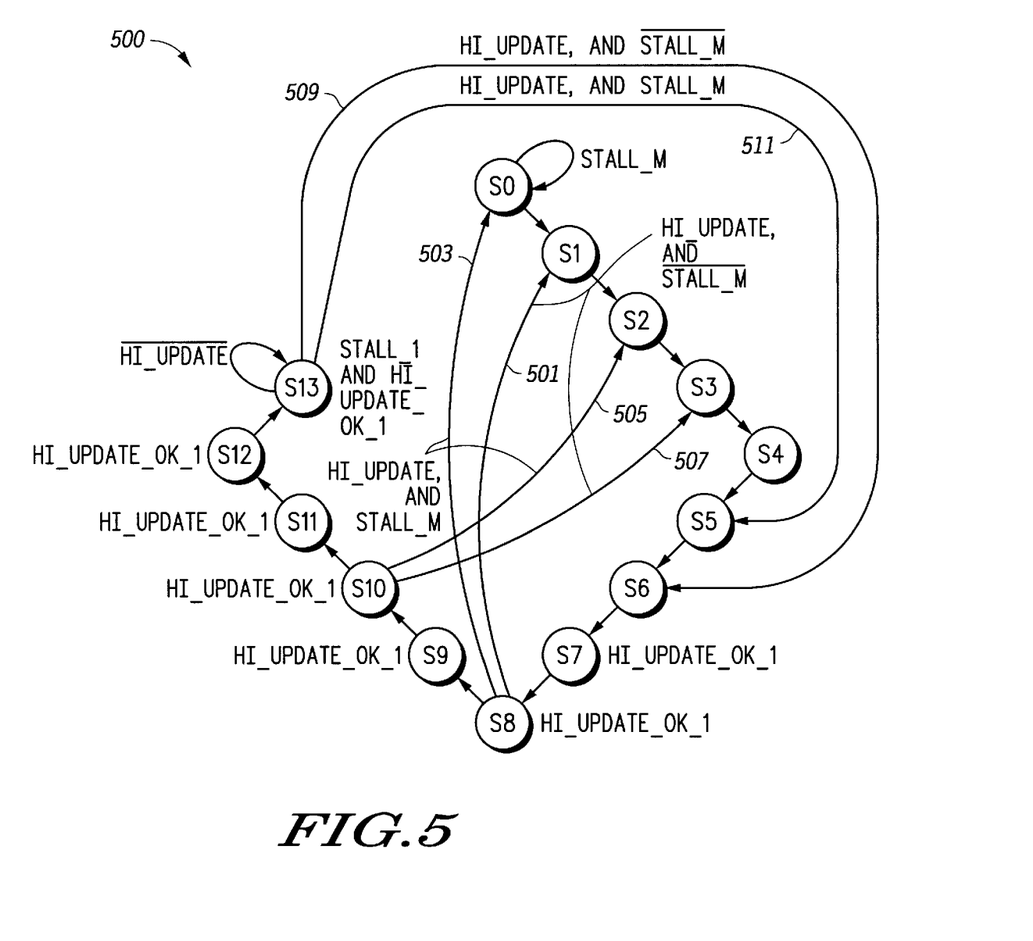
FIG. 5 is a partial state diagram illustrating operation of the state machine associated with the high resolution bus shown in FIG. 1.

FIG. 5 is a partial state diagram 500 illustrating operation of the HSM_1 113 state machine within the image processing unit 107 associated with the HI_BUS 104 (or associated with the HI_A bus if multiple state machines are employed). It is noted that not all of the possible transitions are shown in the partial state diagram 500 for purposes of illustration, in that it would unduly complicate the diagram and obfuscate the described operation. Only those transitions of the embodiment to illustrate the invention are shown. The fourteen (14) states, S1–S13 are shown, where operation transitions from one state to the next upon successive rising edges of the CLK signal as described previously. Although not shown, the HSM_1 113 remains in any given state upon assertion of the STALL_M signal from the control unit 111. The HSM_1 113, however, transitions to a corresponding state upon assertion of the HI_UPDATE signal even during a stall condition, as described in relation to FIG. 4. The HI_UPDATE_OK_1 signal is asserted by the image processing unit 107 in states S7 through S13 in the embodiment shown. If the HI_UPDATE signal is asserted and the STALL_M signal is not asserted in state S8, operation transitions from state S8 to state S1 as shown by transition arrow 501, since state S1 corresponds to next state S9. In particular, the bus bits HI_A[1:3] of state S1 correspond to the bus bits HI_A[9:11] of state S9 to track shifted data bits.

If the STALL_M signal is asserted while in state S8 when the HI_UPDATE signal is also asserted, operation instead transitions from state S8 to corresponding state S0 as indicated by transition arrow 503. Operation remains in state S0 as long as the STALL_M signal is asserted. If the HI_UPDATE signal is not asserted in state S8, operation proceeds to state S9. In fact, operation proceeds from state S8 to states S9–13 in sequential order while the HI_UPDATE signal remains negated. When the HI_UPDATE signal is detected in any one of the states S8 through S13, operation transitions to a corresponding state if the STALL_M signal is asserted or transitions to a next corresponding state if the STALL_M is not asserted. For example, if the HI_UPDATE signal is detected asserted in state S10, then operation transitions to state S2 if the STALL_M signal is asserted as indicated by transition arrow 505 or to next corresponding state S3 if the STALL_M signal is not asserted. If the HI_UPDATE signal is not detected asserted in any of the states S8 to S13, operation remains in state S13 while the HI_UPDATE signal is not asserted. In state S13, the HSM_1 113 is considered stalled and asserts the STALL_1 signal to the control unit 111 indicating a stall condition. If and when the HI_UPDATE signal is asserted in state S13, operation transitions to next corresponding state S6 if the STALL_M signal is not asserted as indicated by transition arrow 509 or to corresponding state S5 if the STALL_M signal is asserted while in state S13 as indicated by transition arrow 511.

As described previously, the HI_BUS 104 and the LOW_BUS 106 are only updated when all of the image processing units 107, 109 are ready for the bus update. Thus, bus updates are made when necessary to as progress is made by the image processing units. Further, the bus updates do not occur until all processing units are ready, since the HI BLOCK 103 and the LO_BLOCK 105 only update after receiving all of the respective UPDATE_OK signals. It is appreciated that high performance is achieved since operation of the image processing units are not interrupted by the bus updates. The data on the upper portion is shifted to the lower portion to make room for new data on the upper portion of each sub bus of the overall bus system. The bus states of each of the image processing units are automatically transitioned to the next corresponding states to track the data shift. Operation continues as if there had not been a bus update, so that performance is not degraded or slowed by bus updates. The width of the bus may be any practicable size and is only constrained by the context or template definitions that define the relative pixels to be utilized at any given time.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. Although the invention has been described with respect to specific conductivity types or polarity of potentials, skilled artisans appreciated that conductivity types and polarities of potentials may be reversed.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A circuit for processing a first image, comprising:
 a first image supply block having an input for receiving data representative of lines of the first image and an output of a first plurality of buses, wherein each bus of the first plurality of buses contains data representative of a selected portion of a selected one of the lines of the first image, wherein the selected portion has two sub-portions;

the first image supply block providing a first sub-portion update signal in response to first and second update ok signals;

a second image supply block having an input for receiving data representative of lines of a second image that is reduced in resolution from said first image and an output of a second plurality of buses, wherein each bus of the second plurality of buses contains data representative of a selected portion of a selected one of the lines of the second image, wherein the selected portion has two sub-portions;

a first image processing unit, coupled to the output of the first image supply block and the second image supply block, for processing the data on the first and second plurality of buses according to a first algorithm and providing the first update ok signal that indicates that one of the two sub-portions of the first image supply block is not in use by the first image processing unit, the first image processing unit receiving the first sub-portion update signal; and a second image processing unit, coupled to the output of the first image supply block and the second image supply block, for processing the data on the first and second plurality of buses according to a second algorithm and for providing the second update ok signal that indicates that one of the two sub-portions of the first image supply block is not in use by the second image processing unit, the second image processing unit receiving the first sub-portion update signal.

2. The circuit of claim 1, wherein:

the first image processing unit further provides a third update ok signal that indicates that one of the two sub-portions of the second image supply block is not in use by the first image processing unit;

the second image processing unit further provides a fourth update ok signal that indicates that one of the two sub-portions of the second image supply block is not in use by the second prediction unit; and the second image supply block further provides a second sub-portion update signal to the first and second image processing units in response to the third and fourth update ok signals.

3. The circuit of claim 2, wherein the first and second image processing units are responsive to the first and second sub-portion update signals.

4. The circuit of claim 3, wherein the first image supply block selects a different sub-portion in response to the first and second update ok signals.

5. The circuit of claim 4, wherein the second image supply block selects a different sub-portion in response to the third and fourth update ok signals.

6. The circuit of claim 1, wherein the first image processing unit is responsive to the first sub-portion update signal.

7. The circuit of claim 1, wherein the first image supply block selects a different sub-portion in response to the first and second update ok signals.

\* \* \* \* \*